Dec. 30, 1924.                                             1,520,715
                        R. B. ISEMAN
                    AUTOMOBILE TURNTABLE
             Filed Aug. 31, 1923        3 Sheets-Sheet 1
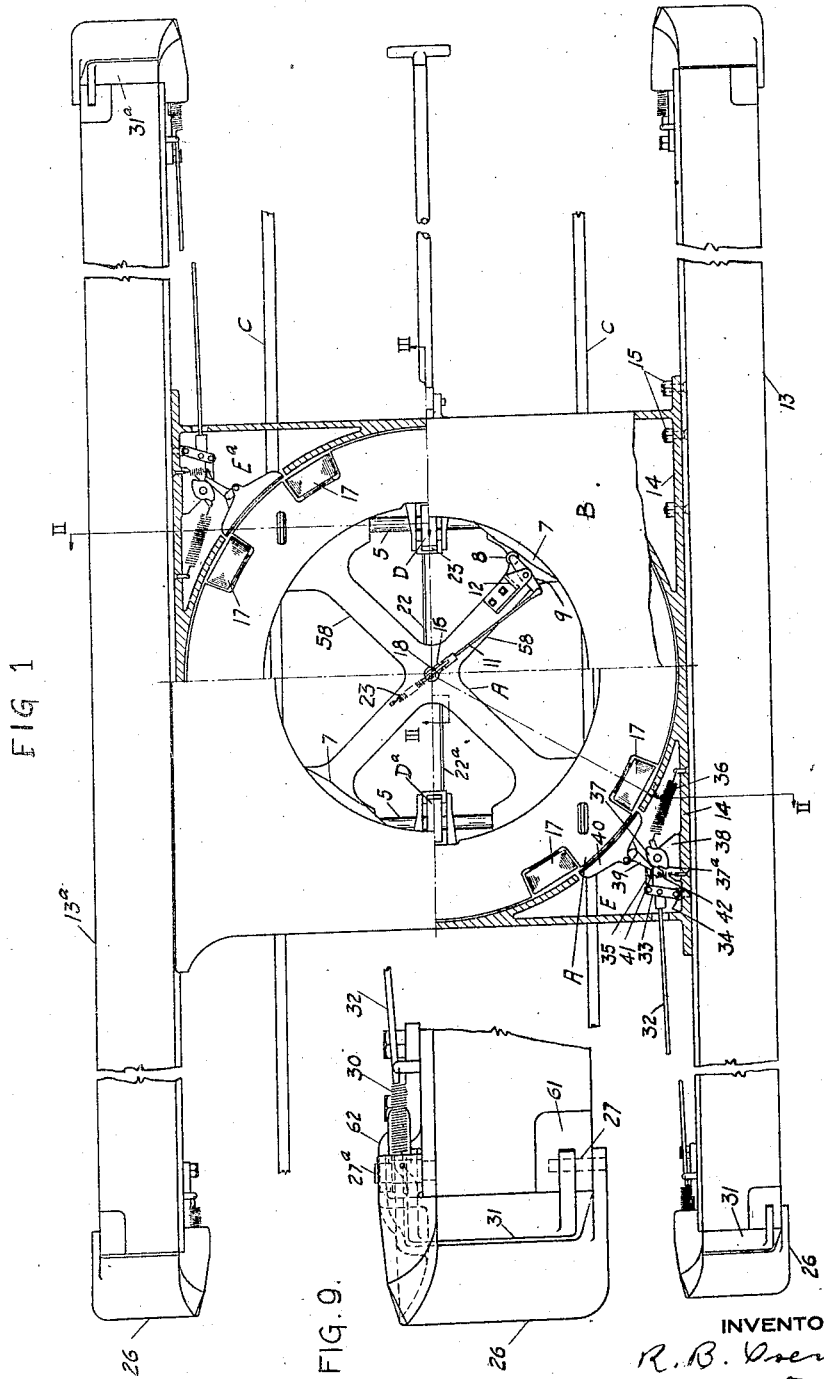
INVENTOR:
R. B. Iseman,
by A. L. Vencill
His Attorney Dec. 30, 1924. 1,520,715
R. B. ISEMAN
AUTOMOBILE TURNTABLE
Filed Aug. 31, 1923 3 Sheets-Sheet 2
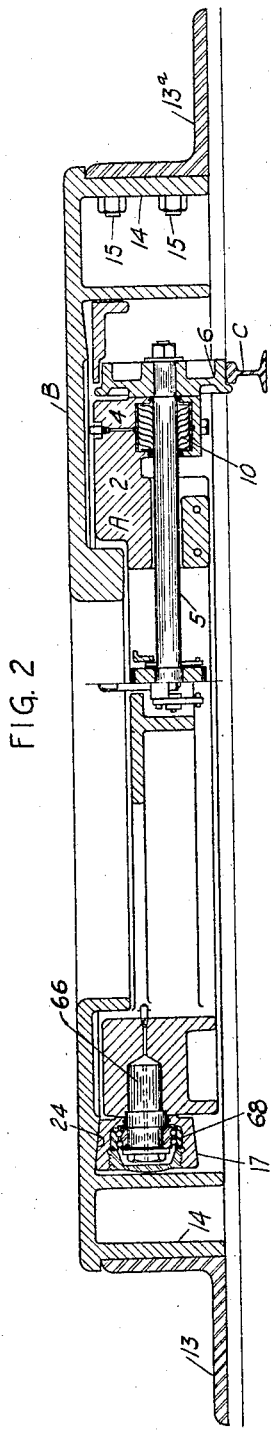
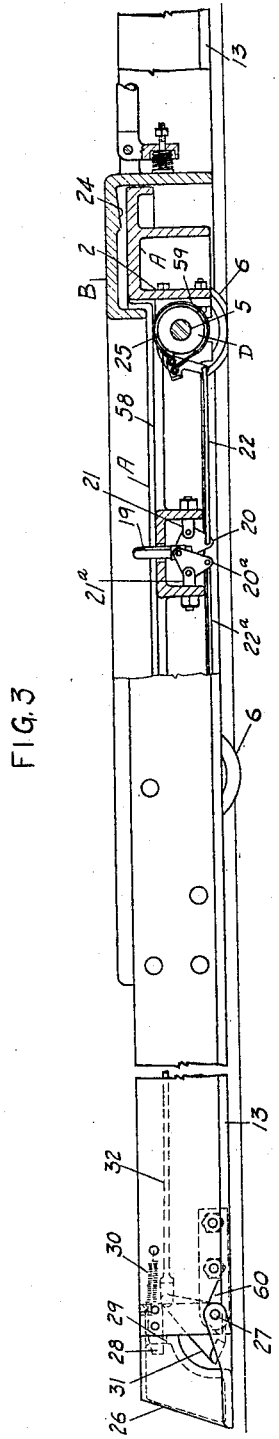
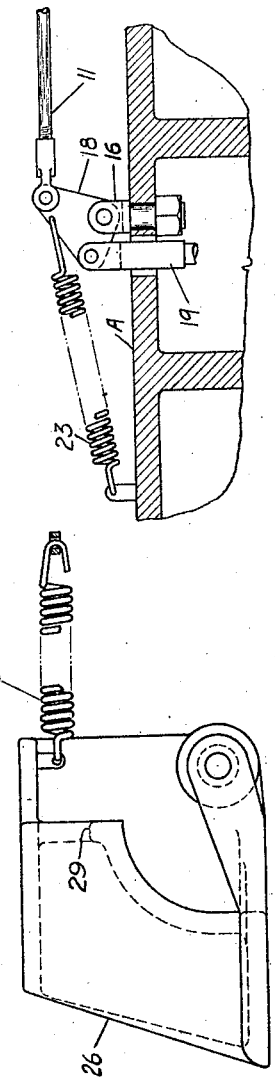
INVENTOR:
R. B. Iseman,
by A. L. Vencill
His attorney

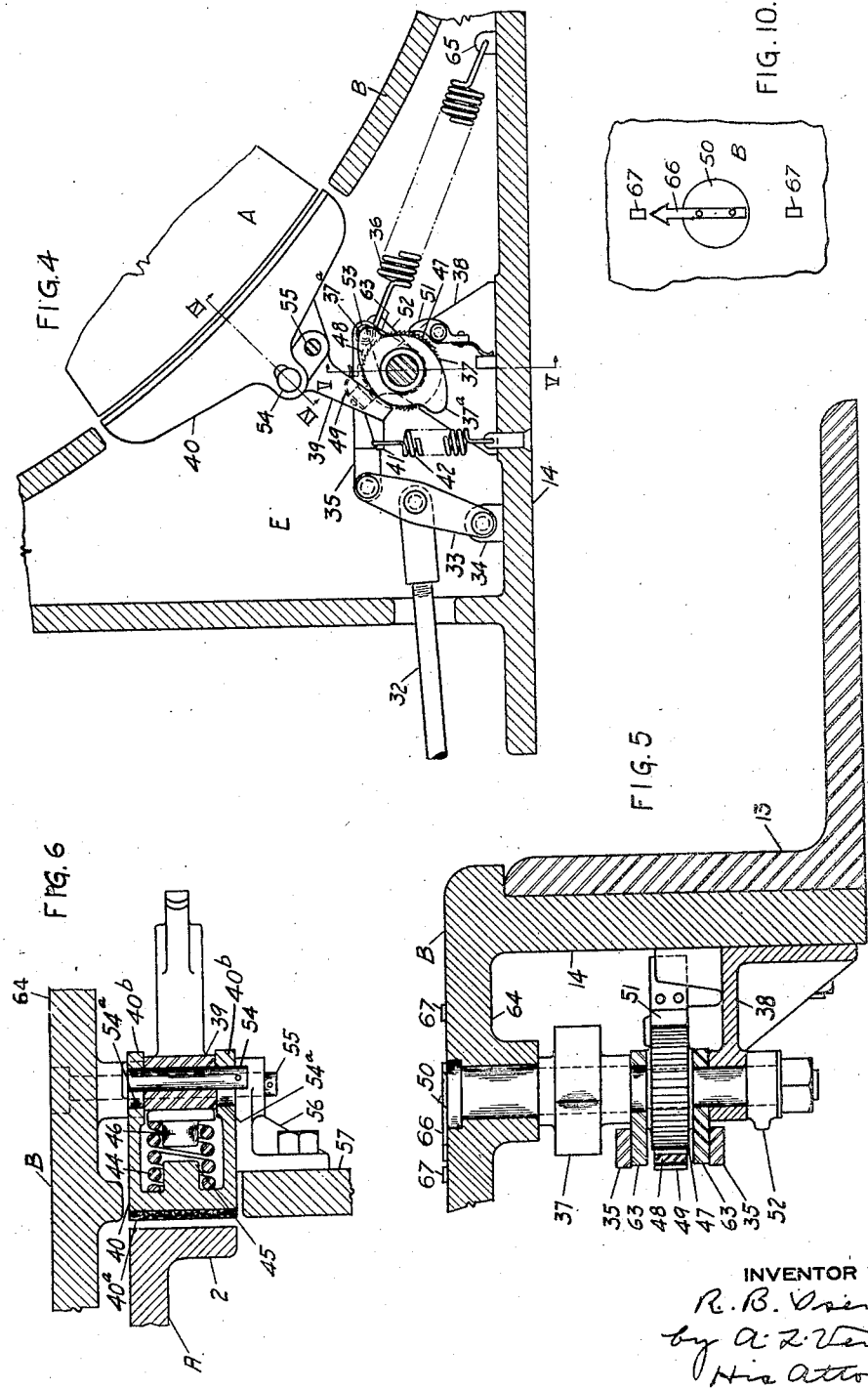

Patented Dec. 30, 1924.

1,520,715

UNITED STATES PATENT OFFICE.

RICHARD B. ISEMAN, OF CLARION, PENNSYLVANIA, ASSIGNOR, BY MESNE ASSIGN-
MENTS, TO AUTO TURN COMPANY, OF CLARION, PENNSYLVANIA, A CORPORATION
OF PENNSYLVANIA.

AUTOMOBILE TURNTABLE.

Application filed August 31, 1923. Serial No. 660,376.

*To all whom it may concern:*

Be it known that I, RICHARD B. ISEMAN, a citizen of the United States, residing at Clarion, in the county of Clarion and State of Pennsylvania, have invented certain new and useful Improvements in Automobile Turntables, of which the following is a specification.

My invention relates to automobile turntables of the traveling type, and particularly to devices of this type which comprise a truck having mobility wheels, and a turret mounted to revolve on the truck and provided with means for supporting an automobile.

One feature of my invention is the provision of braking means for the mobility wheels controlled automatically by the position of the turret with respect to the truck.

Another feature of my invention is the provision of braking means for the turret controlled automatically by an automobile running onto or off from the turret.

I will describe one form of turntable embodying my invention, and will then point out the novel features thereof in claims.

In the accompanying drawings, Fig. 1 is a top plan view, partly sectioned, showing one form of turntable embodying my invention. Fig. 2 is a sectional view on the line II—II of Fig. 1. Fig. 3 is in part a side elevation of the turntable shown in Fig. 1, and in part a sectional view on the line III—III of Fig. 1. Fig. 4 is a plan view showing the turret brake mechanism E of Fig. 1 on a larger scale. Fig. 5 is a sectional view on the line V—V of Fig. 4. Fig. 6 is a sectional view on the line VI—VI of Fig. 4. Fig. 7 is a side view of the clamping wing 26 and spring 30 shown in Figs. 1 and 3. Fig. 8 is a side view showing a portion of the mechanism shown in Figs. 1 and 3 for controlling the truck brake. Fig. 9 is an enlarged plan view of the devices on carrier 13 for controlling the locking of the turret. Fig. 10 is a fragmental top plan view of the turret B showing an indicator for the turret brake.

Similar reference characters refer to similar parts in each of the several views.

Referring to the drawings, the turntable comprises a truck A provided with mobility wheels 6 adapted to run on a track C or on the floor of the garage according as desired, and a turret B mounted to revolve on rollers 17 carried by the truck and provided with carriers 13 and 13ª adapted to support the wheels of an automobile.

The truck A comprises a ring-like member 2 having a plurality of radial spokes 58. The member 2 is provided with four bosses 4 carrying roller bearings 10 in which are journalled two axles 5 to which the mobility wheels 6 are attached. The ring-like member 2 also carries a plurality of studs 66 projecting radially therefrom, and each stud is provided with a ball bearing 68 which supports one of the rollers 17. These rollers are conical in shape, and they co-act with a conically formed track 24 on the under surface of the turret B, as shown in Fig. 2.

The elements thus far referred to are fully described and claimed in a co-pending application for Letters Patent of the United States, Serial No. 660,375, filed on the thirty-first day of August, 1923, by Roy O. Diffenderfer and Carl T. Allme. Inasmuch as these elements form no part of my present invention, I will not describe them in detail herein.

The braking of the mobility wheels 6 is accomplished by two braking devices D and Dª, one on each axle 5. Each of these braking devices is of the well known automobile type comprising a drum 25 fixed to the axle 5, a brake band 59 surrounding the drum, and a rod 22 for tightening the band on the drum. The rod 22 is controlled by a cam 7 fixed to the turret B and co-acting with a roller 8 carried by a lever 9 which is pivotally mounted intermediate its ends in a bracket 12 attached to one of the spokes 58 of the truck A. The other end of the lever 9 is pivotally connected with one end of a link 11, the other end of which link is pivotally connected with a crank 18 journalled in a bracket 16 fixed to the truck A. The crank 18 is likewise pivotally connected to a vertically disposed link 19, which in turn is connected with a crank 20 mounted to swing in a bracket 21 attached to the underside of the truck A. The lower end of the crank 20 is pivotally connected with the rod 22.

A second crank 20ª is similarly mounted in a bracket 21ª secured to the underside of the truck A, and the upper end of this crank 20ª is also pivotally connected with the vertical link 19. The lower end of the crank 20ª is connected with a rod 22ª which controls the braking device Dª. The device Dª is similar to the device D described hereinbefore, but operates on the other axle 5 of the truck A.

Both of the braking devices D and Dª are biased to the released position by a spring 23, one end of which is attached to the crank 18 and the other end to the truck A, as shown in Fig. 8.

The operation of the mobility wheel brakes is as follows:

When the roller 8 is out of engagement with the cam 7, the braking devices D and Dª are released, so that the truck is free to roll along the track C or the floor of the garage. When, however, the turret B is swung to such position that roller 8 is in engagement with the cam 7 the link 11 is pulled outwardly from the center of the truck, the link 19 is raised vertically, the rods 22 and 22ª are pulled radially toward the center of the truck, so that the brakes are applied and the turntable is locked in the position in which it then occupies.

In the arrangement shown in Fig. 1 of the accompanying drawings, the turret is provided with two cams 7 which are so located that the brakes are applied when the turret is in such position that the carriers 13 are parallel with the track rails C. It is understood, however, that any number and any arrangement of cams may be provided on the turret B so that the turntable will be locked in any desired position or positions of the turret with respect to the truck, and so with respect to the track rails C.

The braking of the turret B with respect to the truck is accomplished by two braking devices E and Eª controlled respectively by two treadles 31 and 31ª located at the diagonally opposite outer ends of the two carriers 13 and 13ª, respectively, as shown in Fig. 1.

The treadle 31 is pivotally mounted on two pins 27 and 27ª supported in lug 61 and bracket 62 on the carrier 13 and normally occupying the elevated position in which it is shown in Fig. 3. The treadle is restrained from further upward movement from this position by a heel 60 which engages the upper surface of the carrier 13. Pivotally attached to the treadle 31 is a rod 32 which extends behind the carrier 13 to the braking device E where it is connected with an intermediate point in a lever 33 pivotally mounted at one end in a bracket 34 attached to a wall 14 of the turret B. The free end of lever 33 is connected with one end of a link 35 the other end of which is bifurcated and carries a pin 53 on which a pawl 48 is pivotally mounted. Also pivotally mounted on the pin 53 are two links 63 which are journalled freely on a shaft 50, whereby the pawl 48 is constrained to swing around this shaft as a center. As best shown in Fig. 5, the shaft 50 is journalled in the top plate 64 of the turret B and also in a bracket 38 which is attached to the vertical side member 14 of this turret, so that the shaft 50 is vertically disposed and is free to oscillate. Fixed to the shaft 50 beneath the bracket 38 is an arm 52 which is connected with one end of a spring 36; the other end of this spring is connected with a bracket 65 attached to the vertical plate 14 of the turret. The spring 36 biases the pawl 48, the link 35, the lever 33, and the rod 32 to the positions in which these parts are shown in Fig. 4.

Also fixed to the shaft 50 is a ratchet wheel 47 which coacts with the pawl 48, this pawl being biased into position for engagement with the ratchet wheel by a spring 49 supported on one of the links 63.

Also fixed to the shaft 50 is a wheel 37 having two cams 37ª diametrically disposed and arranged for coaction with a lever 39. As shown in Figs. 4 and 6, this lever is mounted to oscillate on a pin 55, which is supported in the top plate 64 of the turret B, and also in a bracket 56 fixed to a vertical web 57 of this turret. The lever 39 carries a pin 54 which controls a brake shoe 40 provided with a braking surface 40ª, which surface is arranged to coact with the outer periphery of the ring-shaped member 2 of the truck A. The mechanism for controlling the brake shoe 40 by the pin 54 will be explained hereinafter, it being sufficient at this point to state that when the lever 39 is not acted upon by either of the cams 37ª the brake shoe is released from the truck, but that when the lever is swung in clockwise direction, as viewed in Fig. 4, by either of the cams 37ª, the brake shoe 40 is forced into engagement with the truck A. To insure the release of the brake shoe 40 when the lever 39 is released by the cam wheel 37 I provide the lever 39 with an arm 41, which arm is biased in counter-clockwise direction, as viewed in Fig. 4, by a spring 42, the other end of which is anchored on the wall of turret B.

In order to prevent backward rotation of the ratchet wheel 47, I preferably provide an additional pawl 51 pivotally attached to the bracket 38 and arranged to permit rotation of the ratchet wheel in counter-clockwise direction by pawl 48, but to positively prevent rotation of this wheel in the other direction.

The operation of the turret brake is as follows:

Normally the treadle 31 is held in the elevated position by the action of spring 36, so that all parts of the brake are in the positions shown in the drawings. When an automobile rolls onto the carriers 13 and 13ª, the first wheel depresses the treadle 31, thereby pulling the rod 32 outwardly so that the pawl 48 causes a quarter turn of the ratchet wheel 47, the shaft 50, and the cam wheel 37. This quarter turn brings one of the cams 37ª into engagement with the lever 39, so that the brake shoe 40 is forced into engagement with the truck A, and so the turret is locked with respect to the truck. As soon as the first wheel leaves the treadle 31, the rod 32, lever 33, link 35 and pawl 48 return to their normal positions, but the shaft 50 and cam wheel 37 remain stationary, so that the brake is not released. When the rear wheel of the automobile depresses the treadle 31, the operation is repeated, that is, the cam wheel 37 makes another quarter turn so that it releases the lever 39 and the brake shoe is then released from the truck A by the action of spring 42.

When an automobile rolls off from the turret, the operation is repeated, that is, the first wheel which engages the treadle 31 causes a quarter turn of the cam wheel 37 and so causes the brake to be applied, whereas the second wheel which engages the treadle causes another quarter turn of the cam wheel 37 and so causes the brake to be released.

The braking device Eª is controlled by treadle 31ª in exactly the same manner as device E is controlled by treadle 31. It will be seen, therefore, that when an automobile rolls onto the turret from either end, the turret will be locked with respect to the truck by the first right-hand wheel of the automobile and will be released by the second right-hand wheel.

Each end of each carrier 13 and 13ª is provided with a clamping wing 26 which is pivotally mounted on the pins 27 and 27ª and is biased to the position shown in Fig. 3 by a spring 30 anchored on the carrier 13. In this position the wing is free from the floor. The swinging movement of the wing 26 with respect to the carrier 13 is guided by a rod 28 fixed to the carrier 13 and co-acting with a slot 29 in the wing 26. When an automobile rolls onto the carriers 13 and 13ª, each wheel depresses the corresponding wing 26 against the action of the spring 30, so that this wing then rests on the floor and so serves to prevent the turret from revolving on the truck until the treadle 31 is operated to apply the brake. When the automobile rides off from the carrier, this wing 26 likewise serves to lock the turret after treadle 31 has been released and until the automobile wheel is entirely clear of the carrier.

Referring now to Figs. 4 and 6, the mechanism for operating brake shoe 40, is as follows:

This brake shoe is provided with two wings 40ᵇ, as shown in Fig. 6, and is further provided with a stem 45 projecting outwardly from the inner surface of the shoe. The pin 54 operates in slots 54ª in the two wings of the brake shoe and the crank 39 is provided with a stem 46 projecting inwardly toward the stem 45. Interposed between the crank 39 and the shoe 40 is a spring 44 which surrounds both of the stems 45 and 46, and so is guided by these stems. When the crank 39 is swung into brake-applying position, it exerts pressure on the spring 44, and the spring in turn exerts pressure on the shoe 40, tending to force this shoe against the turret A. As long as the braking surface 40ª is in good condition, the stems 45 and 46 do not meet, but as the braking surface 40ª becomes worn, these stems come closer and closer together, until they finally meet when the braking surface is practically worn off. It will thus be seen that the spring 44 compensates for wear of the braking surface 40ª, that is, this spring provides almost constant pressure of the brake shoe on the truck, regardless of the condition of the braking surface 40ª.

It will be apparent from the foregoing that if either treadle 31 or 31ª is depressed accidentally, as, for example, if it is stepped upon, one of the brakes E or Eª will be set or released, according as the brake is previously released or set, and such brake will then be out of tune. That is to say, if the turntable is then unoccupied, one of the brakes will be set and an automobile rolling onto the turret from the corresponding end will release the brake, whereas such automobile should set the brake. It accordingly becomes desirable to indicate at all times the condition of both of the braking devices E and Eª. This may be accomplished by suitable means, such, for example, as the indicating device shown in Figs. 5 and 10. The device in this form comprises a pointer 66 fixed to the upper end of the shaft 50, so that it swings on the upper surface of the turret B. This pointer co-operates with two markers 67 in such manner that when the brake is released, the pointer registers with one marker or the other, whereas when the brake is set the pointer is midway between the two marks. It will be obvious that before allowing an automobile to roll onto or off from the turret B the attendant should make sure that both pointers 66 register with one of their associated markers 67. Any other suitable form of indicating device may be substituted for the device shown in the accompanying drawings.

Although I have herein shown and described only one form of automobile turntable embodying my invention, it is understood that various changes and modifications may be made therein within the scope of the appended claims without departing from the spirit and scope of my invention.

Having thus described my invention, what I claim is:

1. An automobile turntable comprising a truck provided with mobility wheels, a turret revolubly mounted on said truck, and braking means for said wheels controlled by motion of said turret with relation to said truck.

2. An automobile turntable comprising a truck provided with mobility wheels, a turret revolubly mounted on said truck, and braking means for said wheels controlled by revolution of said turret on said truck.

3. An automobile turntable comprising a truck provided with mobility wheels, a turret revolubly mounted on said truck, braking means for said wheels, and means for rendering said braking means effective when said turret is in one position with respect to the truck but not when the turret is in another position with respect to the truck.

4. An automobile turntable comprising a truck provided with mobility wheels, a turret revolubly mounted on said truck, and automatic braking means for said wheels controlled by the position of said turret with respect to said truck.

5. An automobile turntable comprising a truck provided with mobility wheels, a turret revolubly mounted on said truck and provided with a cam, and braking means for said wheels controlled by said cam.

6. An automobile turntable comprising a truck provided with mobility wheels, a turret revolubly mounted on said truck, said turret being provided with a cam; a lever pivotally mounted on said truck and provided with a roller co-acting with said cam, a bell crank pivotally mounted on said truck, a link connecting said lever and said bell crank, a second bell crank mounted on said truck, a vertical link connecting said two bell cranks, braking means for said truck wheels, and a link connecting said second bell crank with said braking means.

7. An automobile turntable comprising a truck provided with mobility wheels, a turret revolubly mounted on said truck and provided with a cam, a follower mounted on said truck, and braking means for said wheels controlled by said follower.

8. An automobile turntable comprising a truck provided with mobility wheels, a turret revolubly mounted on said truck, a brake for said mobility wheels controlled by the position of the turret on the truck, and a brake for said turret controlled by an automobile running onto or off from the turret.

In testimony whereof I affix my signature.

RICHARD B. ISEMAN.